United States Patent [19]

Schaerer

[11] Patent Number: 5,896,701
[45] Date of Patent: Apr. 27, 1999

[54] HYDROPONIC CULTIVATION RECEPTACLE

[75] Inventor: Emil A. Schaerer, Küsnacht, Switzerland

[73] Assignee: Schaerer Company, Kusnacht, Switzerland

[21] Appl. No.: 09/015,311

[22] Filed: Jan. 29, 1998

[30] Foreign Application Priority Data

Jun. 13, 1997 [JP] Japan .................. 9-005044 U

[51] Int. Cl.$^6$ .................. A01G 31/00; A01G 31/02; A01G 23/02; A01G 25/00
[52] U.S. Cl. .................. 47/61; 47/59; 47/65.5; 47/65.7; 47/73; 47/79; 47/80; 206/815
[58] Field of Search .................. 47/61, 59, 65.5, 47/65.7, 73, 79, 80; 206/815

[56] References Cited

U.S. PATENT DOCUMENTS 4,135,331  1/1979  Lamlee ........................ 47/61

*Primary Examiner*—Karen Cochrane Carlson
*Assistant Examiner*—Tekchand Saidha
*Attorney, Agent, or Firm*—Longacre & White

[57] ABSTRACT

A hydroponic cultivation receptacle comprising a tray 22 having a board 22a to place seeds of small vegetables like sprouts has plural drainage holes 23 on the board 22a and upper rims of said drainage holes 23 to form protrusion 24 so as to retain a little amount of water to dip lower part of the seeds placed on the board 22a. Accordingly, water remained to the height of protrusion 24 retains enough water to keep lower part of the seeds by surface tension while most water provided inside tray 22 drained from the drainage holes 23. Protrusion 24 prevents the seeds from moving from the place they are uniformly placed and the problem of moving of the seeds when water is poured is also solved.

5 Claims, 5 Drawing Sheets

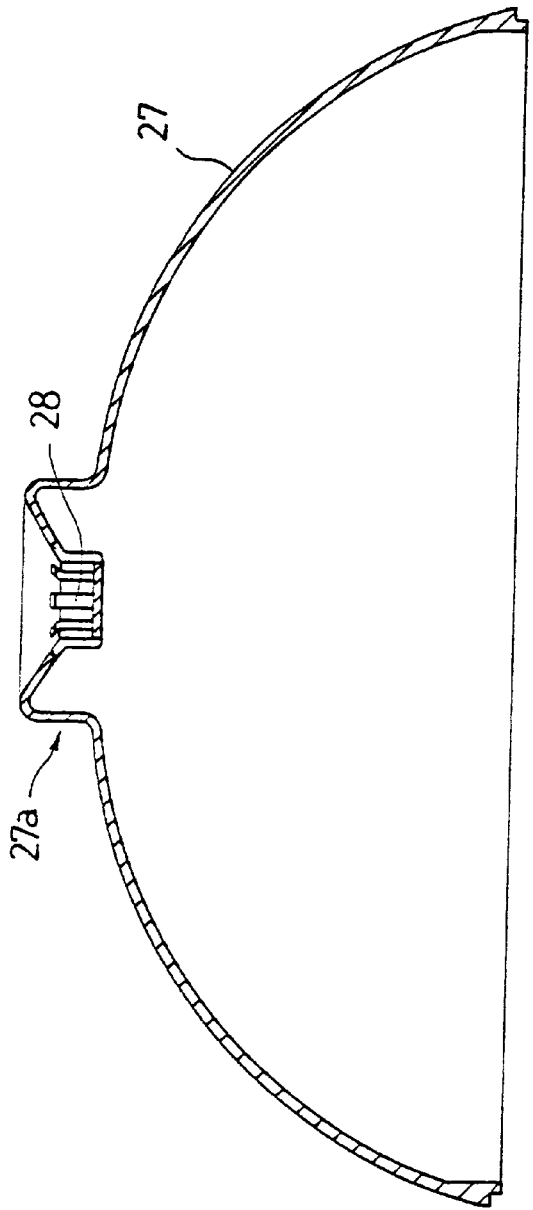
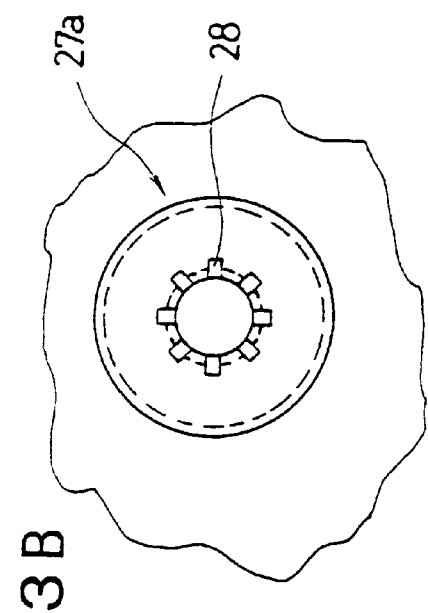

HYDROPONIC CULTIVATION RECEPTACLE

DETAILED DESCRIPTION OF THE INVENTION

1. Field of the Invention

The present invention relates to a hydroponic cultivation receptacle for small sized vegetables such as sprouts and water cress.

2. Prior Art

There has been an increased demand for organic vegetables, especially pesticide-free vegetables from the health point of view. Since it is possible to domestically cultivate pesticide-free vegetables and eat them freshly, kitchen garden is a great concern. Small sized vegetables are especially suitable for kitchen garden and in particular sprouts, water cress and the like vegetables are very popular as they grow fast and can be cultivated merely by water. Typically, such vegetables are grown in a bowl by dipping seeds in a little water, or alternatively in a cultivation receptacle.

One example of a conventional cultivation receptacle is shown in FIG. 5. The cultivation receptacle 31 consists of a tray 32 and a board 33 for placing seeds. The tray 32 is made from transparent acrylic resin. Said tray 32 forms a housing for the cultivation receptacle. The upper end of said tray 32 is open and the lower end of said tray is in the form of truncated pyramid gradually narrowing towards the bottom so as to provide a tapered portion. The board 33 is detachable from the open upper end of said tray 32 and when in use, it is supported in the tray by the tapered portion as shown in FIG. 6. Plural holes 33a are provided throughout said board 33 at given intervals.

In the domestic cultivation of sprouts or water cress, an appropriate water supply is essential for preventing the vegetables from spoiling. However, it is difficult to provide a suitable amount of water with the use of conventional receptacles. As shown in FIG. 6, in the conventional cultivation receptacle 31 water must be supplied at a level where seeds are dipped at the bottom, i.e. a slightly upper level than the upper surface of the board 33, lower than that level will result in drying of the seeds and upper than that level such that the seeds are completely soaked with water will result in rotting of the seeds.

With the foregoing difficulty of the conventional cultivation receptacle in mind, there is proposed a hydroponic cultivation receptacle, in which seeds are placed on a sponge mat instead of a board material and water can be supplied under capillary action. However, the sponge mat of multi-porous structure is susceptible to propagation of bacteria and is thus insanitary. Further, there is also a problem that chemical components contained in the mat dissolve in water and contaminate the crops.

The cultivation receptacle 33 has further drawbacks in that dust may enter from the open end of the tray and in that the water in the tray will become foul after a long period of time, leading to insanitation of the receptacle.

SUMMARY OF THE INVENTION

In view of the above, the present invention seeks to provide a hydroponic cultivation receptacle which is sanitary in use and which can provide seeds or roots with a suitable amount of water.

These objects of the invention may be accomplished by the provision of a hydroponic cultivation receptacle which comprises trays each having a board to place seeds of small sized vegetables like sprouts, the board having drainage holes to drain water within the tray, and means for retaining water to dip the lower part of the seeds placed on the board when drainage from the drainage holes has finished.

The hydroponic cultivation receptacle of the present invention may comprise plural drainage holes substantially throughout the boards, and the upper rim of each drainage hole is formed protrudently.

The hydroponic cultivation receptacle of the present invention may also comprise a detachable dome-like lid for the purpose of dustproof and moisture retention. Also for the purpose of space-saving and ventilation, the trays may be a stackable configuration, and the side wall of each tray and the top of the lid are provided with ventilation holes.

The hydroponic cultivation receptacle of the invention may further comprise a tray for receiving drainage from the trays. This drainage tray may be formed from a resin which reduces ultraviolet incidence so that the drained water will not become foul after a long period of time. The drainage tray may also be formed from a transparent or colored transparent material so that the amount of water in the tray is visible.

BRIEF DESCRIPTION OF THE DRAWINGS

FIG. 3 shows a dome-like lid of the cultivation receptacle, and FIG. 3A is a sectional view of the lid and FIG. 3B is a top plan view of the ventilation holes.

EMBODIMENT OF THE INVENTION

Preferred embodiment of the invention will be hereinafter described in relation to the accompanying drawings.

Figure 1:
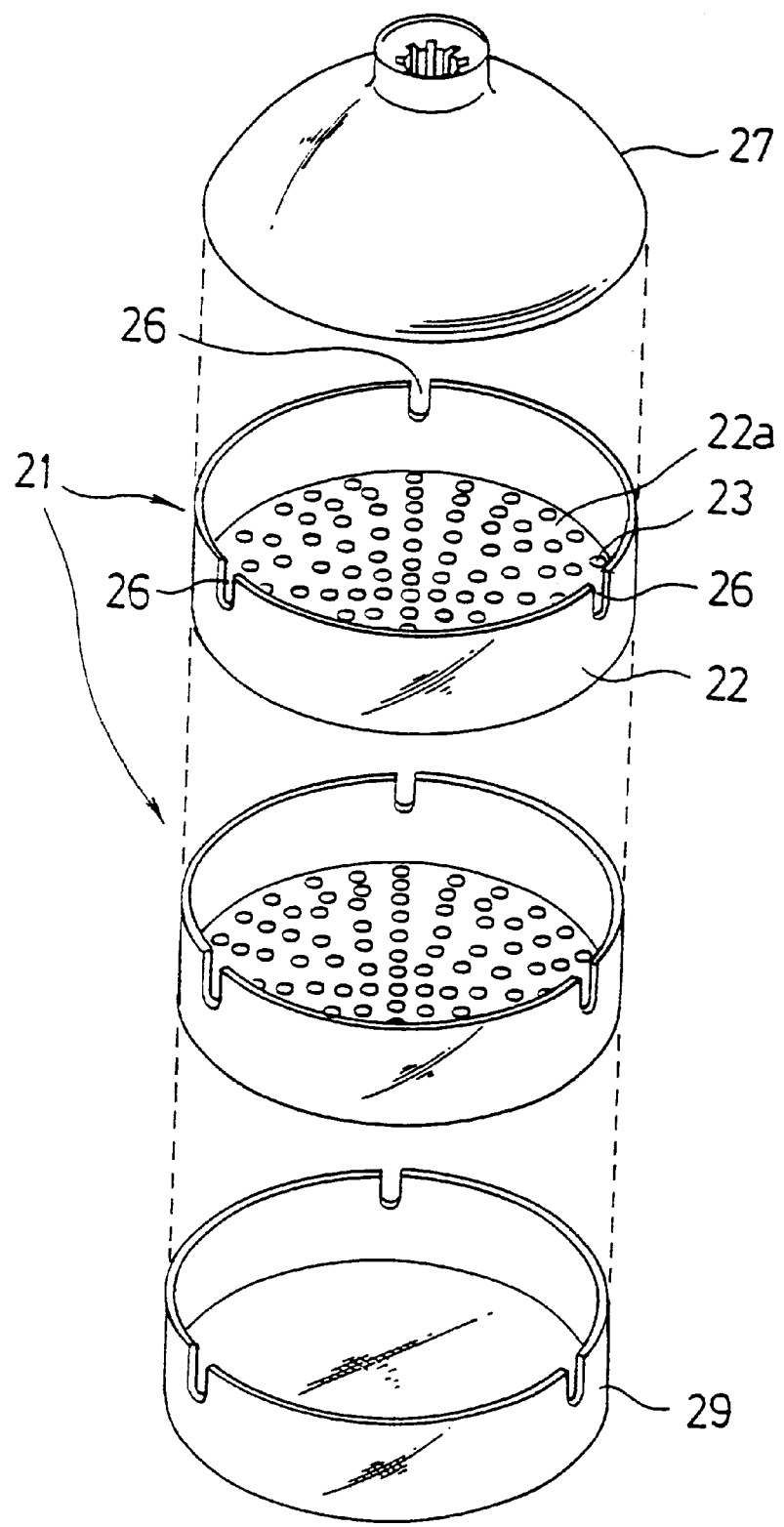
FIG. 1 is a perspective view of the hydroponic cultivation receptacle of the present invention with the lid and trays disassembled.

As shown in FIG. 1, a hydroponic cultivation receptacle 21 comprises a plurality of trays 22. Each tray 22 is formed from a housing of transparent acrylic resin. The tray 22 is in the form of a laboratory dish, the upper end of which is open and the bottom end 22a of which is formed as a board for placing seeds. A plurality of drainage holes 23 are provided substantially throughout the board 22a at given intervals. In this embodiment, the diameter of each drainage hole 23 is about 2 mm. If the diameter of each drainage hole is too small, a great amount of water upon drainage will remain on the board 22a under the surface tension. When smaller sized seeds are placed on the board 22a, a circular sheet of non-woven fabric may be used.

Figure 2:
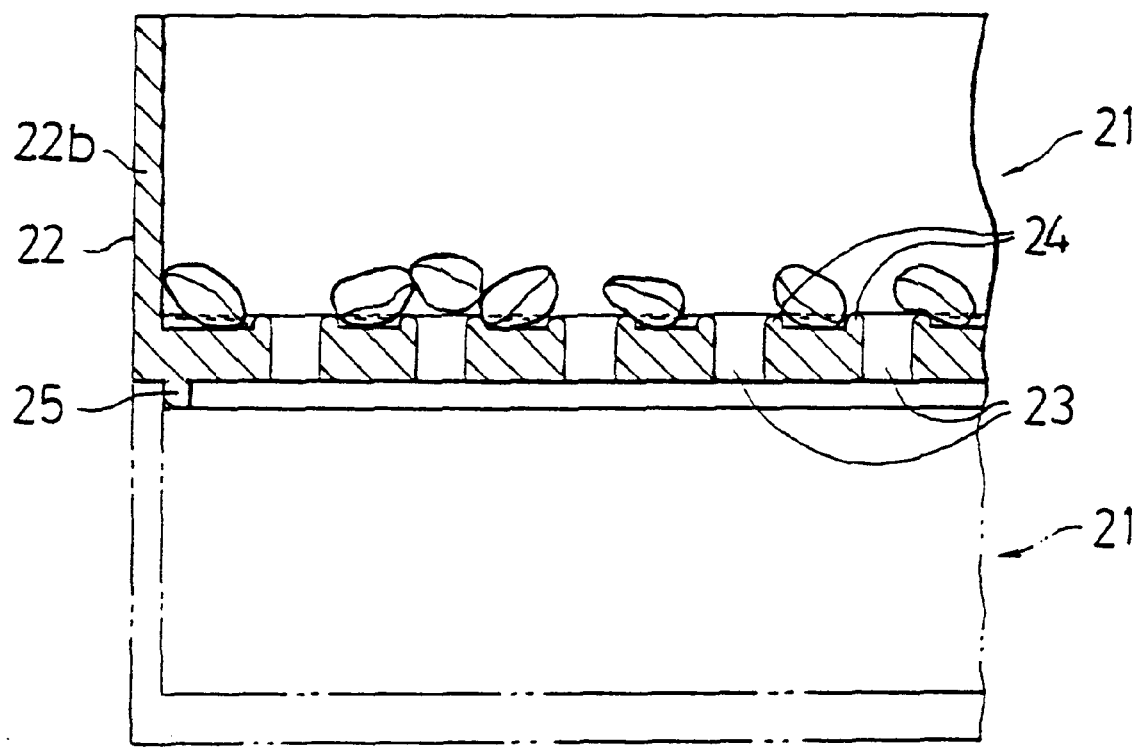
FIG. 2 is a partly diagrammatic sectional view of the hydroponic cultivation receptacle of the present invention.

As shown in FIG. 2, the upper rim of each drainage hole 23 is formed protrudently so that most of the water supplied in the tray 22 is drained from the drainage holes 23, while the rest of the water still remains at the level of the height of each protrusion 24, dipping seeds at the bottom. The provision of the protrusions 24 also prevents the seeds uniformly placed on the board 22a from displacing, leading to solution of the problem that the seeds on the board are flown upon supplying water.

The hydroponic cultivation receptacle 21 of the present invention is a stackable configuration. For this purpose, each tray 22 has an annular positioning stopper or a plurality of positioning stoppers 25 protruding from the under surface of the board 22a. When the trays 22 are stacked, the stopper or stoppers 25 of the tray abuts on the upper inner surface of the superimposed tray 22. Each tray 22 has a plurality of ventilation holes for ventilation upon stacking. In this embodiment, three ventilation holes 26 are provided by notching the upper periphery of the side wall 22b of each tray 22 at 120° angles. Such stackable configuration is particularly advantageous for cultivating crops in large quantities or for various different kinds of vegetables due to its minimal space requirement.

The hydroponic cultivation receptacle 21 of the present invention includes a dome-like lid 27 detachable from the tray 22. As shown in FIG. 3A, because of its dome-like shape water vapor rising from the tray 22 becomes dew in the inner surface of the lid, leading to excellent moisture retention within the tray 22. The dome-like lid 27 contributes to the reduction of degree of light reflectance at the outer surface thereof. In other words, light extinction modulus is improved, hence promoting the growth of the vegetables in the tray 22.

Ventilation holes 28 are provided in a central recess of a handle portion 27a of the lid 27. More specifically, the ventilation holes 28 are made by cutting out the peripheral wall of the central recess so as to provide a plurality of slits. The ventilation holes 28 can also be used as an inlet for water. In the hydroponic cultivation receptacle 21, it is not necessary to open the lid until the crops are harvested, leading to high moisture retention within the trays 22.

The hydroponic ventilation receptacle 21 of the present invention is made from transparent or colored transparent resin which reduces ultraviolet incidence. A detachable tray 29 for receiving the drainage from the trays 22 is provided for the receptacle 21. The drainage tray 29 also has a plurality of ventilation holes at the side wall thereof The provision of the tray 29 facilitates the disposal of the drained water within the receptacle 21 since the tray 29 can be removed from the tray 22. Further, the receptacle 21 of the present invention is very clean, free from suffering from propagation of bacteria since it is formed from the ultraviolet-reducing material, preventing the water in the tray 29 from getting foul after a long period of time. Moreover, due to its transparency the amount of water within the receptacle 21 is visible.

Figure 4:
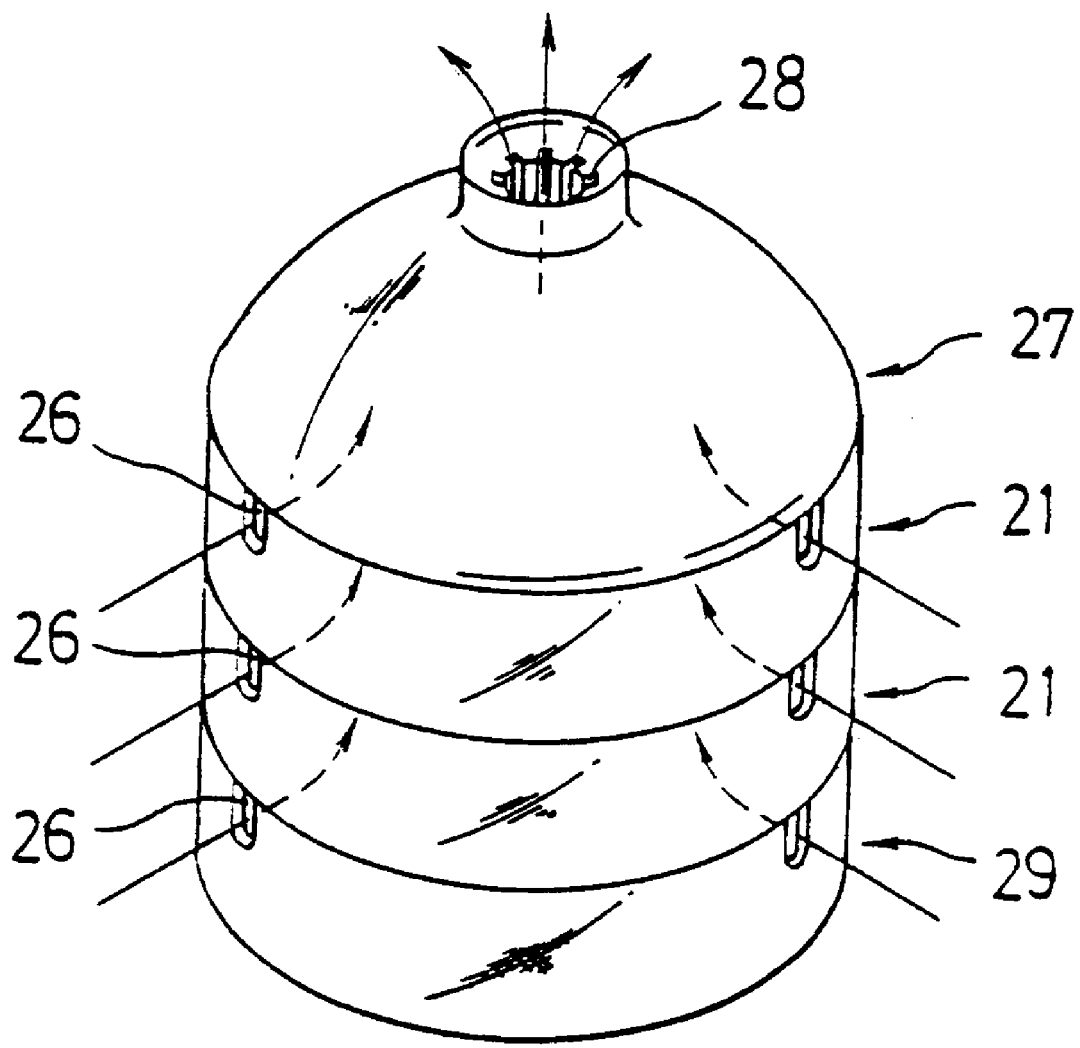
FIG. 4 is a perspective view explaining the ventilation of the cultivation receptacle of the present invention.
Figure 5:
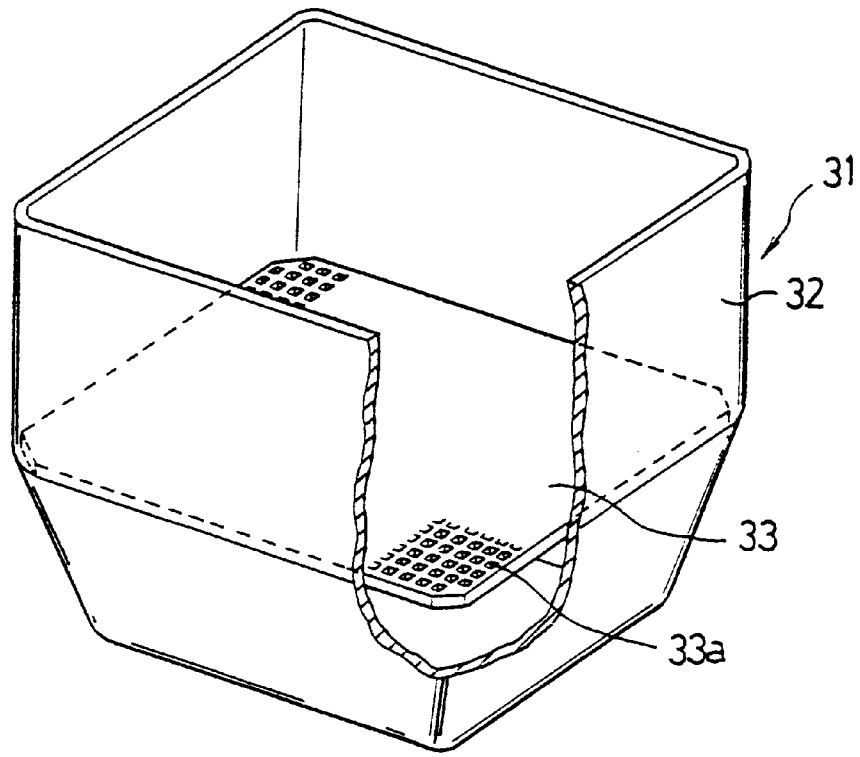
FIG. 5 is a partially cutaway view in perspective of a conventional hydroponic cultivation receptacle.
Figure 6:
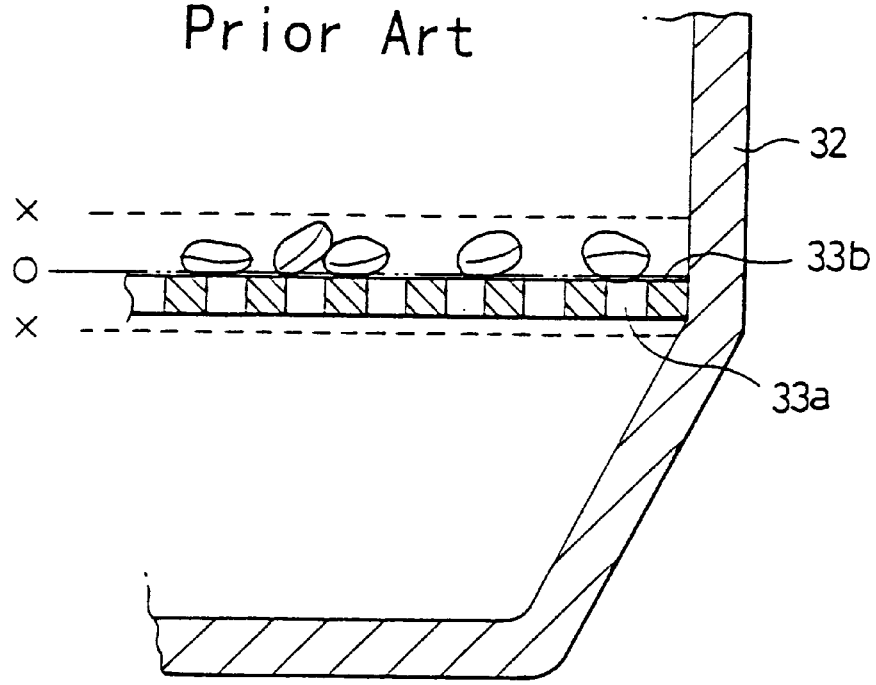
FIG. 6 is a partly diagrammatic sectional view of the conventional cultivation receptacle illustrating the board supported by the tapered portion.

As is shown in FIG. 4, air circulation is effected in the hydroponic cultivation receptacle 21. Oxygen is taken from the ventilation holes of each tray 22 and 29, and then carbon dioxide gas generated within the receptacle 21 goes out from the ventilation holes 28 provided in the lid 27. The provision of a plurality of drainage holes 23 on the board 22a of each tray 22 also contributes to a smooth ventilation between the trays, resulting in smooth and effective air circulation within the receptacle 21.

While the invention has been described in conjunction with its preferred embodiment, it should be noted that the preferred embodiment described may be changed in the details of construction and the combination and arrangement of parts may also be resorted to without departing from the scope of the invention.

EFFECTS OF THE INVENTION

The hydroponic cultivation receptacle of the present invention has the following advantages:

(1) By way of the means for retaining water to dip the lower part of the seeds placed on the board when drainage from the drainage holes has finished, a suitable amount of water is supplied to seeds, leading to promotion of the growth of the vegetables and sanitary cultivation without spoiling the vegetables;

(2) By way of the dome-like lid, water vapor rising from the tray 22 becomes dew in the inner surface of the lid, leading to excellent moisture retention within the tray. The provision of the lid also contributes to improving light extinction modulus, hence promoting the growth of the vegetables in the receptacle;

(3) By way of the stackable configuration of the receptacle, the space requirement for cultivating crops in large quantities or for various different kinds of vegetables can be minimized; and (4) By way of the drainage tray formed from ultraviolet-reducing material, the drained water in the tray will not become foul after a long period of time, preventing propagation of bacteria.

What is claimed is:

1. A hydroponic cultivation receptacle characterized in that the receptacle comprising trays having a board to place seeds of vegetables and the board has drainage holes to drain water in said trays, having a means to retain enough water to keep lower part of the seeds placed on said board in water when drainage from said drainage holes has terminated.

2. A hydroponic cultivation receptacle according to claim 1 wherein plural drainage holes are provided all over said board and upper rims of said drainage holes are formed protrudently.

3. A hydroponic cultivation receptacle according to claim 1 wherein a dome-like lid is detachably provided to said tray.

4. A hydroponic cultivation receptacle according to claim 3 wherein said trays are stackably provided and side wall of said trays and the top of said lid have holes for ventilation.

5. A hydroponic cultivation receptacle according to claim 1 wherein said receptacle is made of transparent or colored and transparent resin to reduce ultraviolet rays and has a tray to receive water drained from said trays.

* * * * *